US006825268B2

(12) United States Patent
Maier et al.

(10) Patent No.: US 6,825,268 B2
(45) Date of Patent: Nov. 30, 2004

(54) POLYURETHANE (POLYMER HYBRID) DISPERSION WITH REDUCED HYDROPHILICITY, METHOD FOR PRODUCING THE SAME AND THE USE THEREOF

(75) Inventors: Alois Maier, Engelsberg (DE); Norbert Steidl, Kienberg (DE); Alfred Kern, Kirchweidach (DE); Franz Wolfertstetter, Palling (DE); Gerhard Reusmann, Essen (DE); Frank Reichel, Essen (DE)

(73) Assignee: SKW Bauwerkstoffe Deutschland GmbH, Trostberg (DE)

( * ) Notice: Subject to any disclaimer, the term of this patent is extended or adjusted under 35 U.S.C. 154(b) by 0 days.

(21) Appl. No.: 10/220,089

(22) PCT Filed: Aug. 7, 2001

(86) PCT No.: PCT/EP01/09135

§ 371 (c)(1),
(2), (4) Date: Nov. 26, 2002

(87) PCT Pub. No.: WO02/12364

PCT Pub. Date: Feb. 14, 2002

(65) Prior Publication Data

US 2003/0187136 A1 Oct. 2, 2003

(30) Foreign Application Priority Data

Sep. 8, 2000 (DE) ........................ 100 38 941

(51) Int. Cl.$^7$ ................................. C08G 18/48
(52) U.S. Cl. ................. 524/840; 524/837; 524/832; 524/846
(58) Field of Search ................. 524/837, 840, 524/832, 846

(56) References Cited

U.S. PATENT DOCUMENTS 5,677,413 A * 10/1997 Seneker et al.

FOREIGN PATENT DOCUMENTS

| WO | WO-98 27132 A | * | 6/1998 |
| WO | WO-99 50325 A | * | 10/1999 |
| WO | WO-00 50484 | * | 8/2000 |

OTHER PUBLICATIONS

Database WPI, Sec. CH. Week 200152, Derwent Publications Ltd., and JP 204244 B—Sep. 4, 2001 (Abst.).*

* cited by examiner

Primary Examiner—Rachel Gorr
(74) Attorney, Agent, or Firm—Fulbright & Jaworski L.L.P.

(57) ABSTRACT

Polyurethane or polyurethane polymer hybrid dispersions, with reduced hydrophilicity and methods for preparing and using them are disclosed.

48 Claims, No Drawings

POLYURETHANE (POLYMER HYBRID) DISPERSION WITH REDUCED HYDROPHILICITY, METHOD FOR PRODUCING THE SAME AND THE USE THEREOF

This appln is a 371 of PCT/EP01/09135 Aug. 7, 2001.

The present invention relates to polyurethane or polyurethane polymer hybrid dispersions with reduced hydrophilicity, methods for producing the same and the use thereof.

The binder class consisting of aqueous or water-based polyurethanes has been known for more than 40 years. The property profile of the water-based polyurethanes has continuously been improved in the past decades, which is impressively demonstrated by a large number of patents and publications on this subject area. Regarding the chemistry and technology of water-based polyurethanes, reference may be made to D. Dieterich, K. Uhlig in *Ullmann's Encyclopedia of Industrial Chemistry, Sixth Edition* 1999 *Electronic Release*. Wiley-VCH; D. Dieterich in *Houben-Weyl, Methoden der Organischen Chemie*. Vol. E20, H. Bartl, J. Falbe (editors), Georg Thieme Verlag, Stuttgart 1987, page 1641 et seq.; D. Dieterich, Prog. Org. Coat. 9 (1981) 281–330; J. W. Rosthauser, K. Nachtkamp, Journal of Coated Fabrics 16 (1986) 39–79; R. Arnoldus, Surf. Coat. 3 (Waterborne Coat.) (1990), 179–98.

The fact that aqueous polyurethanes have become increasingly important commercially precisely in recent years is due to three reasons:

1. The increasingly stringent environmental legislation requires the development of ecologically and physiologically tolerated products for which the emissions of solvents and other volatile organic compounds (VOC) have been reduced to a minimum.
2. The use of expensive organic solvents in conventional and aqueous polyurethanes is undesirable for economic reasons.
3. The performance of water-based polyurethanes reaches or surpasses that of the conventional isocyanate- and/or solvent-containing polyurethanes.

Water-based polyurethanes are becoming more and more important as binders also in applications involving construction chemistry. In particular, low-solvent (low VOC) or solvent-free (zero VOC) polyurethane dispersions and polyurethane polymer hybrid dispersions which have a high solids content and can be made available with the aid of efficient and universal preparation processes are desired in construction chemistry.

However, it is precisely in applications involving construction chemistry that binders which have high elasticity and, in the formulated state, do not tend to embrittlement, have a high early water resistance and can withstand continuous loading with water without significant swelling are required. Optimum material properties (combination of high tensile strength and high elongation at the tensile strength) can be achieved only as water-based polyurethanes based on polypropylene glycols. Polypropylene glycols also have the necessary saponification stability. However, conventional polyurethane (polymer hybrid) dispersions based on polypropylene glycols have a hydrophilicity which is not negligible in practice.

Polyurethane dispersions and polyurethane polymer hybrid dispersions based on polypropylene glycols are already sufficiently well known from the patent document WO 99/50 325, U.S. Pat. No. 5,576,382, EP-A 712 877, DE 199 49 971, WO 99/16805 and U.S. Pat. No. 5,859,111.

Water-based polyurethanes in which the imparting of water repellency to the polyurethane backbone internally in the polymer led to material properties better than or comparable with the base system have, however, been unknown to date.

It was therefore the object of the present invention to develop a polyurethane (polymer hybrid) dispersion which has reduced hydrophilicity and does not have the stated disadvantages of the prior art but possesses good performance characteristics and at the same time can be produced taking into account ecological, economic and physiological aspects.

This object was achieved, according to the invention, by providing a polyurethane or polyurethane polymer hybrid dispersion which is obtainable by reacting a) 50 to 100 parts by weight of a hydrophobically modified block copolymer (A)(i) having two or more hydroxyl groups and a molecular weight of 500 to 6 000 dalton, comprising 10 to 90% by weight of a polymer having properties imparting water repellency and 90 to 10% by weight of a polypropylene oxide polymer, and/or 50 to 100 parts by weight of a hydrophobic block copolymer (A)(ii) having two or more hydroxyl groups and a molecular weight of 500 to 6 000 dalton, comprising two or more hydrophobic alkylene oxides, and/or 50 to 100 parts by weight of a hydrophobically modified random copolymer (A)(iii) having two or more hydroxyl groups and a molecular weight of 500 to 6 000 dalton, comprising 10 to 90% by weight of a hydrophobic alkylene oxide in combination with suitable initiator molecules and 90 to 10% by weight of propylene oxide, b) 14 to 140 parts by weight of a polyol component (B), containing $b_1$) 2 to 20 parts by weight of a low molecular weight and anionogenic polyol component (B)(i) having two or more hydroxyl groups and one or more carboxyl and/or sulfo group(s) inert to polyisocyanates and a molecular weight of 100 to 1 000 dalton, $b_2$) if required, 2 to 20 parts by weight of low molecular weight polyol component (B)(ii) having two or more hydroxyl groups and a molecular weight of 50 to 499 dalton, $b_3$) if required, 10 to 100 parts by weight of a further polymeric polyol (B)(iii) having two or more hydroxyl groups and a molecular weight of 500 to 6 000 dalton, c) 25 to 250 parts by weight of a polyisocyanate component (C) comprising at least one polyisocyanate, polyisocyanate derivative or polyisocyanate homolog having two or more aliphatic or aromatic isocyanate groups, d) 2 to 20 parts by weight of a neutralizing component (D), e) 3 to 30 parts by weight of a chain-extender component (E) and f) 100 to 5 000 parts by weight of water to give a solvent-free or low-solvent polyurethane dispersion and, if required, then allowing said dispersion to react further with g) 117.5 to 3 200 parts by weight of a monomer component (F) comprising at least one monomer having one or more double bonds capable of free radical polymerization and h) 0.5 to 50 parts by weight of an initiator component (G) comprising at least one lipophilic free radical initiator having one or more thermally labile azo or peroxo groups to give a solvent-free or low-solvent polyurethane polymer hybrid dispersion.

It has in fact surprisingly been found that, by using hydrophobically modified block copolymers and/or hydrophobic block copolymers and/or hydrophobically modified random copolymers as polyols, not only are polyurethane (polymer hybrid) dispersions having a reduced hydrophilicity or water absorption obtainable but these can moreover be produced in solvent-free or low-solvent form and with high solids contents. In addition, it was not foreseeable that the polyurethane (polymer hybrid) dispersions according to the invention could have only a very low requirement for stabilizing groups and have excellent mechanical properties in comparison with polyurethane (polymer hybrid) dispersions based on pure polypropylene glycols. Owing to stronger orientation or phase separation of hard segments and soft segments (hydrophobically modified block copolymers and/or hydrophobic block copolymers and/or hydrophobically modified random copolymers) in the polyurethane polymer according to the invention, the carboxylate and/or sulfonate groups required for stabilization are sterically shielded to a lesser extent and can therefore better stabilize the micelles of the polyurethane (polymer hybrid) dispersion. In the case of polyurethane (polymer hybrid) dispersions having soft segments based on pure polypropylene glycols, this effect does not exist and some of the carboxylate and/or sulfonate groups required for stabilization are therefore present in "deactivated" form.

The polyurethane (polymer hybrid) dispersion according to the invention, having reduced hydrophilicity, is defined by its multistage method of production. In reaction stage a), a solvent-free or low-solvent polyurethane dispersion is first produced and, if required, is then reacted further, in reaction stage b), to give a solvent-free or low-solvent polyurethane polymer hybrid dispersion.

In order to carry out this method, 50 to 100 parts by weight of a hydrophobically modified block copolymer (A)(i) and/or 50 to 100 parts by weight of a hydrophobic block copolymer (A)(ii) and/or 50 to 100 parts by weight of a hydrophobically modified random copolymer (A)(iii), if required 2 to 20 parts by weight of a low molecular weight polyol component (B)(ii) and, if required, 10 to 100 parts by weight of a further polymeric polyol (B)(iii) are reacted with 25 to 250 parts by weight of a polyisocyanate component (C), if required in the presence of a catalyst, in reaction stage $a_1$), preferably using the techniques customary in polyurethane chemistry, to give a polyurethane preadduct. The production of the polyurethane preadduct according to reaction stage $a_1$) is preferably effected by a procedure in which component (C) is added to or metered into the mixture (A)(i) and/or (A)(ii) and/or (A)(iii), if required (B)(ii) and, if required, (B)(iii) within a period of a few minutes to a few hours or, alternatively, the mixture of the components (A)(i) and/or (A)(ii) and/or (A)(iii), if required (B)(ii) and, if required, (B)(iii) is added to or metered into component (C) within a period of a few minutes to a few hours.

In the subsequent reaction stage $a_2$), the partly or completely reacted polyurethane preadduct from stage $a_1$) is reacted with 2 to 20 parts by weight of a low molecular weight and anionogenic polyol component (B)(i) to give the corresponding polyurethane prepolymer. The production of the polyurethane prepolymer according to reaction stage $a_2$) is preferably effected by a procedure in which the finely milled polyol component (B)(i) having a mean particle size of <150 μm is added to or metered into the polyurethane preadduct from stage $a_1$) within a period of a few minutes to a few hours. The polyurethane preadduct from stage $a_1$) which is used in reaction stage $a_2$), can, if required, also have free hydroxyl groups in addition to isocyanate groups and/or polyisocyanate monomers in the case of an appropriate process or incomplete reaction. In order to reduce the viscosity, small amounts of organic solvents can be used in reaction stage $a_1$) and/or in reaction stage $a_2$).

Alternatively, a premix of 50 to 100 parts by weight of a hydrophobically modified block copolymer (A)(i) and/or 50 to 100 parts by weight of a hydrophobic block copolymer (A)(ii) and/or 50 to 100 parts by weight of a hydrophobically modified random copolymer (A)(iii), 2 to 20 parts by weight of a low molecular weight and anionogenic polyol component (B)(i), if required 2 to 20 parts by weight of a low molecular weight polyol component (B)(ii) and, if required, 10 to 100 parts by weight of a further polymeric polyol (B)(iii) can also be produced in reaction stage $a_1$) and can be reacted in reaction stage $a_2$) with 25 to 250 parts by weight of a polyisocyanate component (C), if required stepwise and, if required, in the presence of a catalyst to give a polyurethane prepolymer. The production of the polyurethane prepolymer according to reaction stage $a_2$) is preferably effected by a procedure in which the component (C) is added to or metered into the mixture of the components (A)(i) and/or (A)(ii), (B)(i), if required (B)(ii) and, if required, (B)(iii) within a period of a few minutes to a few hours or, alternatively, the mixture of components (A)(i) and/or (A)(ii) and/or (A)(iii), (B)(i), if required (B)(ii) and, if required, (B)(iii) is added to or metered into the component (C), if required stepwise within a period of a few minutes to a few hours. In order to reduce the viscosity, if required small amounts of organic solvents can be used in reaction stage $a_1$) and/or in reaction stage $a_2$).

The procedure of reaction stages $a_1$) and $a_2$) is relatively uncritical with respect to the reaction conditions. The reaction batch is stirred in reaction stages $a_1$) and $a_2$) with utilization of the exothermic nature of the polyaddition reaction until the calculated or theoretical NCO content is reached, preferably at 60 to 120° C., particularly preferably at 80 to 100° C., under an inert gas atmosphere. The required reaction times are in the region of a few hours and are decisively influenced by reaction parameters such as the reactivity of the components, the stoichiometry of the components and the temperature.

The reaction of the components (A), (B) and (C) in reaction stage $a_1$) and/or $a_2$) can be carried out in the presence of a catalyst customary for polyaddition reactions with polyisocyanates. If required, these catalysts are added in amounts of 0.01 to 1% by weight, based on the components (A) and (B). Customary catalysts for polyaddition reactions with polyisocyanates are, for example, dibutyltin oxide, dibutyltin dilaurate (DBTL), triethylamine, tin(II) octanoate, 1,4-diazabicyclo[2.2.2]octane (DABCO), 1,4-diazabicyclo[3.2.0]-5-nonene (DBN) and 1,5-diazabicyclo [5.4.0]-7-undecene (DBU).

The component (A)(i) consists of at least one hydrophobically modified block copolymer having two or more hydroxyl groups reactive toward polyisocyanates and an average molecular weight (number average) of 500 to 6 000 dalton, comprising 10 to 90% by weight of a polymer having properties imparting water repellency and 90 to 10% by weight of a polypropylene oxide polymer. Saponification-stable block copolymers having an ABA, BAB or $(AB)_n$ structure can be used as suitable hydrophobically modified block copolymers (A)(i), A representing a polymer segment having properties imparting water repellency and B representing a polymer segment based on polypropylene oxide.

The component (A)(ii) consists of a hydrophobic block copolymer having two or more hydroxyl groups reactive toward polyisocyanates and an average molecular weight (number average) of 500 to 6 000 dalton, comprising two or more hydrophobic alkylene oxides. Saponification-stable block copolymers having an $A_1A_2A_3$ or $(A_1A_2)_n$ structure can be used as suitable hydrophobic block copolymers (A)(ii), $A_1$, $A_2$ and $A_3$ each representing polymer segments having properties imparting water repellency. Polybutylene oxide, polydodecyl oxide, polyisoamyl oxide, poly-α-pinene oxide, polystyrene oxide, polytetramethylene oxide, polyoxetane, substituted polyoxetanes, further aliphatic and/or aromatic polyoxyalkylenes having 4 to 30 carbon atoms per alkylene oxide, α,ω-polymethacrylatediols, α,ω-dihydroxyalkylpolydimethylsiloxanes, macromonomers, telechelic polymers or mixtures thereof are preferred as polymer segments A, $A_1$, $A_2$ or $A_3$. Poly(propylene oxide)-block-poly(butylene oxide)-block-poly (propylene oxide) and/or poly(propylene oxide)-block-poly(styrene oxide)-block-poly(propylene oxide) and/or poly(propylene oxide)-block-poly (tetramethylene oxide)-block-poly(propylene oxide) and/or poly(butylene oxide)-block-poly (propylene oxide)-block-poly(butylene oxide) and/or poly(styrene oxide)-block-poly (propylene oxide)-block-poly(styrene oxide) are preferably used as component (A)(i) and poly (butylene oxide)-block-poly(tetramethylene oxide)-block-poly(butylene oxide), composed of 10 to 90% by weight of polybutylene oxide and/or polystyrene oxide and/or polytetramethylene oxide and 90 to 10% by weight of polypropylene oxide, having a molecular weight of 1 000 to 3 000 dalton, are preferably used as component (A)(ii).

The component (A)(iii) consists of at least one hydrophobically modified random copolymer having two or more hydroxyl groups reactive toward polyisocyanates and an average molecular weight (number average) of 500 to 6 000 dalton, comprising 10 to 90% by weight of a hydrophobic alkylene oxide in combination with suitable initiator molecules and 90 to 10% by weight of propylene oxide. Hydrolysis-stable random copolymers of at least one hydrophobic alkylene oxide and propylene oxide can be used as suitable hydrophobically modified random copolymers (A)(iii). Butylene oxide, dodecyl oxide, isoamyl oxide, α-pinene oxide, styrene oxide, oxetane, substituted oxetanes, further aliphatic and/or aromatic polyoxyalkylenes having 4 to 30 carbon atoms per alkylene oxide or mixtures thereof are preferred as hydrophobic alkylene oxides. Poly(butylene oxide)-co-poly(propylene oxide) and/or poly(dodecyl oxide)-co-poly(propylene oxide) and/or poly(isoamyl oxide)-co-poly(propylene oxide) and/or poly (α-pinene oxide)-co-poly(propylene oxide) and/or poly (styrene oxide)-co-poly(propylene oxide), composed of 10 to 90% by weight of butylene oxide and/or dodecyl oxide and/or isoamyl oxide and/or α-pinene oxide and/or styrene oxide and 90 to 10% by weight of propylene oxide, having a molecular weight of 2 000 to 3 000 dalton, are preferably used as component (A)(iii).

The components (A)(i), (A)(ii) and (A)(iii) contain no polymeric ethylene oxide. The polymer segments A, $A_1$, $A_2$ or $A_3$ contain no polymeric propylene oxide. Block copolymers or random copolymers based on ethylene oxide and propylene oxide are definitively unsuitable, especially since permanent hydrophilicity is introduced by ethylene oxide. The components (A)(i), (A)(ii) and (A)(iii) may furthermore have polymer segments based on polyalkylene oxides which contain bisphenol A or other hydrophobic initiator molecules. The initiator molecules are in general aliphatic and/or aromatic difunctional alcohols, monofunctional primary amines, difunctional secondary amines, water or mixtures thereof.

The component (B)(i) consists of at least one low molecular weight and anionogenic polyol having two or more hydroxyl groups reactive toward polyisocyanates and one or more carboxyl and/or sulfo groups which are inert to polyisocyanates and some or all of which can be converted into carboxylate and/or sulfonate groups in the presence of bases. The component (B)(i) can also be used in the form of its salts with bases. For example, 2-hydroxymethyl-3-hydroxypropanoic acid or dimethylolacetic acid, 2-hydroxymethyl-2-methyl-3-hydroxypropanoic acid or dimethylolpropionic acid, 2-hydroxymethyl-2-ethyl-3-hydroxypropanoic acid or dimethylolbutyric acid, 2-hydroxymethyl-2-propyl-3-hydroxypropanoic acid or dimethylolvaleric acid, citric acid, tartaric acid, [tris (hydroxymethyl)methyl]-3-aminopropanesulfonic acid (TAPS, from Raschig GmbH), building blocks based on 1,3-propane sulfone (from Raschig GmbH) and/or 3-mercaptopropanesulfonic acid sodium salt (MPS, from Raschig GmbH) can be used as low molecular weight and anionically modifiable polyols. These building blocks can, if required, also have amino groups instead of hydroxyl groups. The molecular weight of the low molecular weight and anionogenic polyol (B)(i) is 100 to 1 000 dalton. Bishydroxyalkane-carboxylic acids having a molecular weight of 100 to 200 dalton and in particular 2-hydroxymethyl-2-methyl-3-hydroxypropanoic acid or dimethylolpropionic acid (trade name DMPA, from Trimet Technical Products, Inc.) are preferably used.

The component (B)(ii) consists of at least one low molecular weight polyol having two or more hydroxyl groups reactive toward polyisocyanates and an average molecular weight of 50 to 499 dalton. For example, 1,2-ethanediol or ethylene glycol, 1,2-propanediol or 1,2-propylene glycol, 1,3-propanediol or 1,3-propylene glycol, 1,4-butanediol or 1,4-butylene glycol, 1,6-hexanediol or 1,6-hexamethylene glycol, 2-methyl-1,3-propanediol, 2,2-dimethyl-1,3-propanediol or neopentylglycol, 1,4-bis(hydroxymethyl)cyclohexane or cyclohexanedimethanol, 1,2,3-propanetriol or glycerol, 2-hydroxymethyl-2-methyl-1,3-propanol or trimethylolethane, 2-ethyl-2-hydroxymethyl-1,3-propanediol or trimethylolpropane, 2,2-bis(hydroxymethyl)-1,3-propanediol or pentaerythritol can be used as suitable low molecular weight polyols.

The polyol component (B)(iii) consists of at least one higher molecular weight polyol having two or more hydroxyl groups reactive toward polyisocyanates and an average molecular weight (number average) of 500 to 6 000 dalton. Polymeric polyols, such as polyalkylene glycols, aliphatic and/or aromatic polyesters, polycaprolactones, polycarbonates, α,ω-polymethacrylatediols, α,ω-dihydroxyalkylpolydimethylsiloxanes, macromonomers, telechelic polymers, hydroxyfunctional epoxy resins or mixtures thereof can be used as suitable polymeric polyols.

Suitable polyalkylene glycols are, for example, polypropylene glycols, polytetramethylene glycols or polytetrahydrofurans and reaction products of monofunctional polyalkylene glycols, polyisocyanates and compounds having three groups reactive toward polyisocyanates. Linear or difunctional polypropylene glycols having an average molecular weight (number average) of 1 000 to 3 000 dalton are preferably used as component (B)(iii).

Suitable aliphatic and/or aromatic polyesters (B)(iii) are, for example, condensates based on 1,2-ethanediol or ethylene glycol and/or 1,4-butanediol or 1,4-butylene glycol and/or 1,6-hexanediol or 1,6-hexamethylene glycol and/or 2,2-dimethyl-1,3-propanediol or neopentylglycol and/or 2-ethyl-2-hydroxymethyl-1,3-propanediol or trimethylolpropane and 1,6-hexanedioic acid or adipic acid and/or 1,2-benzenedicarboxylic acid or phthalic acid and/or 1,3-benzenedicarboxylic acid or isophthalic acid and/or 1,4-benzenedicarboxylic acid or terephthalic acid and/or 5-sulfoisophthalic acid sodium salt or its esters and reaction products of epoxides and fatty acids. Linear or difunctional aliphatic or aromatic polyesterpolyols having an average molecular weight (number average) of 1 000 to 3 000 dalton are preferably used.

Polycaprolactones based on ε-caprolactone, polycarbonates based on dialkyl carbonates and glycols and combinations thereof likewise belong to the group consisting of the polyesters. Linear or difunctional types having an average molecular weight (number average) of 1 000 to 3 000 dalton are preferably used.

Preferably used α,ω-polymethacrylatediols (TEGO® Diol BD 1000, TEGO® Diol MD 1000 N, TEGO® Diol MD 1000x, from Tego Chemie Service GmbH) and α,ω-dihydroxyalkylpolydimethylsiloxanes are linear or difunctional types having an average molecular weight (number average) of 500 to 3 000 dalton.

The polyisocyanate component (C) consists of at least one polyisocyanate, polyisocyanate derivative or polyisocyanate homolog having two or more aliphatic and/or aromatic isocyanate groups. In particular, the polyisocyanates sufficiently well known in polyurethane chemistry or combinations thereof, are suitable. For example, 1,6-diisocyanatohexane (HDI), 1-isocyanato-5-isocyanatomethyl-3,3,5-trimethylcyclohexane or isophorone diisocyanate (IPDI), bis(4-isocyanatocyclohexyl)methane ($H_{12}$MDI), 1,3-bis(1-isocyanato-1-methylethyl)benzene (m-TMXDI) or technical isomer mixtures of the individual aliphatic polyisocyanates can be used as suitable aliphatic polyisocyanates. For example, 2,4-diisocyanatotoluene or toluene diisocyanate (TDI), bis(4-isocyanatophenyl)methane (MDI) and, if required, higher homologs thereof (polymeric MDI) or technical isomer mixtures of the individual aromatic polyisocyanates can be used as suitable aromatic polyisocyanates. Furthermore, the so-called "coating polyisocyanates" based on bis(4-isocyanatocyclohexyl)methane ($H_{12}$MDI), 1,6-diisocyanatohexane (HDI) or 1-isocyanato-5-isocyanatomethyl-3,3,5-trimethylcyclohexane (IPDI) are in principle also suitable. The term "coating polyisocyanates" denotes those derivatives of these diisocyanates which have allophanate, biuret, carbodiimide, isocyanurate, uretdione or urethane groups and in which the residual content of monomeric diisocyanates was reduced to a minimum according to the prior art. In addition, modified polyisocyanates, which are obtainable, for example, by hydrophilic modification of "coating polyisocyanates" based on 1,6-diisocyanatohexane (HDI), can also be used. The aliphatic polyisocyanates are preferable to the aromatic polyisocyanates. Furthermore, polyisocyanates having isocyanate groups of different reactivity are preferred.

The ratio of the number of equivalents of NCO to that of OH of the components (A), (B) and (C) is preferably adjusted to a value of 1.25 to 2.5, particularly preferably of 1.4 to 2.0.

Polyisocyanates having isocyanate groups of different reactivity are preferably used in order to obtain narrower molecular weight distributions with lower nonuniformity. Accordingly, polyurethane prepolymers having a linear structure which are composed of difunctional polyol and polyisocyanate components are preferred.

The viscosity of the polyurethane prepolymers is relatively low and substantially independent of the structure of the polyol and polyisocyanate components used. An addition of solvents for reducing the viscosity or for improving the dispersing properties of the polyurethane prepolymers is generally not necessary. The particular structure of the prepolymers permits the production of products having extremely high solids contents. Moreover, owing to the uniform distribution of the carboxylate or sulfonate groups over the polyurethane polymer, only very low charge densities are required for stabilizing the corresponding polyurethane dispersions.

The polyurethane prepolymer from reaction stage $a_2$) is reacted with 2 to 20 parts by weight of a neutralizing component (D) for neutralizing some or all of the carboxyl and/or sulfo groups in the subsequent reaction stage $a_3$), before and/or during the dispersing in 100 to 5 000 parts by weight of water (direct or indirect neutralization). In the case of direct neutralization, the neutralizing component (D) is introduced into the polyurethane prepolymer before the dispersing in water; in the case of indirect neutralization, the neutralizing component (D) is initially introduced before the dispersing in water. If required, a combination of direct and indirect neutralization can also be used.

The reaction stage $a_3$) is preferably carried out at a temperature of 40 to 60° C., in particular at about 50° C.

The neutralizing component (D) consists of one or more bases which serve for neutralizing some or all of the carboxyl and/or sulfo groups. If the component (B)(i) is already present in the form of its salts, the neutralizing component (D) can be dispensed with. For example, tertiary amines, such as N,N-dimethylethanolamine, N-methyldiethanolamine, triethanolamine, N,N-dimethylisopropanolamine, N-methyldiisopropanolamine, triisopropanolamine, N-methylmorpholine, N-ethylmorpholine, triethylamine or ammonia, or alkali metal hydroxides, such as lithium hydroxide, sodium hydroxide, potassium hydroxide or mixtures thereof, can be used as suitable bases. Tertiary amines and in particular triethylamine are preferably used.

The neutralizing component (D) is added in an amount such that the degree of neutralization, based on the free carboxyl and/or sulfo groups of the polyurethane prepolymer, is preferably 70 to 100 equivalent %, particularly preferably 80 to 90 equivalent %. During the neutralization, carboxylate and/or sulfonate groups are formed from the carboxyl and/or sulfo groups and serve for anionic modification or stabilization of the polyurethane dispersion.

During the dispersing, the polyurethane prepolymer is transferred to the dispersing medium and forms a polyurethane prepolymer dispersion thereby. The neutralized polyurethane prepolymer thereby forms micelles which have stabilizing carboxylate and/or sulfonate groups on the surface and reactive isocyanate groups in the interior. All cations for the anionic carboxylate and/or sulfonate group are dissolved in the dispersing medium. The terms "dispersing" or "dispersion" include the meaning that, in addition to dispersed components having a micellar structure, solvated and/or suspended components may also be contained. For the transfer of the polyurethane prepolymer in the aqueous phase, either the polyurethane prepolymer can be stirred into the dispersing medium or the dispersing medium can be stirred into the polyurethane prepolymer (inverse method).

The hardness of the water used is unimportant for the method, and the use of distilled or demineralized water is therefore not necessary. High hardnesses result in a further reduction in the water absorption of the polyurethane dispersions and of the polyurethane polymer hybrid dispersions without adversely affecting their material properties.

The neutralized and dispersed polyurethane prepolymer (polyurethane prepolymer dispersion) from reaction stage $a_3$) is reacted in the subsequent reaction stage $a_4$) with 0.1 to 2% by weight of a chain-extender component (E).

The reaction stage $a_4$) is preferably carried out at a temperature of 30 to 50° C., in particular at about 40° C.

The chain-extender component (E) consists of at least one polyamine having two or more amino groups reactive toward polyisocyanates. For example, adipic acid dihydrazide, ethylenediamine, diethylenetriamine, triethylenetetramine, tetraethylenepentamine, pentaethylenehexamine, dipropylenetriamine, hexamethylenediamine, hydrazine, isophoronediamine, N-(2-aminoethyl)-2-aminoethanol, adducts of salts of 2-acrylamido-2-methylpropane-1-sulfonic acid (AMPS®) and ethylenediamine, adducts of salts of (meth)acrylic acid and ethylenediamine, adducts of 1,3-propane sulfone and ethylenediamine or any desired combination of these polyamines can be used as suitable polyamines. Difunctional primary amines and in particular ethylenediamine are preferably used.

The chain-extender component (E) is added in an amount such that the degree of chain extension, based on the free isocyanate groups of the polyurethane prepolymer, is 50 to 100 equivalent %, preferably 70 to 80 equivalent %. The chain-extender component (E) can be diluted in the weight ratio 1:1 to 1:10 in previously removed amounts of water, in order to suppress the additional exothermicity by hydration of the amines.

The chain extension of the polyurethane prepolymer dispersion leads to an increase in the molecular weight within the micelles and to the formation of a polyurethane-polyurea dispersion of high molecular weight. The chain-extender component (E) reacts thereby with reactive isocyanate groups substantially more rapidly than water. After the reaction stage $a_4$), any free isocyanate groups still present are subjected to complete chain extension with water.

The solids content of the polyurethane polymer consisting of the components (A) to (E) is preferably adjusted to 30 to 70% by weight, particularly preferably to 40 to 60% by weight, based on the total amount of the polyurethane dispersion.

The content of carboxylate and/or sulfonate groups in the polyurethane polymer of the components (A) to (E) is preferably adjusted to 10 to 50 meq·(100 g)$^{-1}$, particularly preferably to 15 to 45 meq·(100 g)$^{-1}$, and the acid number is preferably adjusted to 5 to 25 meq KOH·g$^{-1}$, particularly preferably 7.5 to 22.5 meq KOH·g$^{-1}$.

In order to carry out this method further, a prepared mixture of 117.5 to 3 200 parts by weight of the monomer component (F) and 0.05 to 50 parts by weight of the initiator component (G) can be added to the polyurethane dispersion from reaction stage $a_5$), using the technique customary in polymerizations, in reaction stage $b_1$). The molar initiator/monomer ratio of the components (G) and (F) is preferably adjusted in the range from 0.001 to 0.05. According to a preferred embodiment, a part of the water from stage $a_4$) is not added until stage $b_1$), for adjusting the solids content. The reaction stage $b_1$) is preferably carried out at a temperature of 15 to 35° C., in particular at 20 to 30° C.

The monomer component (F) consists of one or more monomers having one or more double bonds capable of free radical polymerization. For example, acrylic acid, acrylamide, N,N-dimethylacrylamide, acrylonitrile, methyl acrylate, ethyl acrylate, vinyl acrylate, propyl acrylate, isopropyl acrylate, butyl acrylate, isobutyl acrylate, tert-butyl acrylate, hexyl acrylate, cyclohexyl acrylate, octyl acrylate, 2-ethylhexyl acrylate, 3,3,5-trimethylhexyl acrylate, dodecyl acrylate, isododecyl acrylate, octadecyl acrylate and 2-hydroxyethyl acrylate, hydroxypropyl acrylate (isomer mixture), (2-dimethylamino)ethyl acrylate, (3-dimethylamino) propyl acrylate, 3-sulfopropyl acrylate potassium salt, methacrylic acid, methacrylic anhydride, methacrylamide, N,N-dimethylmethacrylamide, methacrylonitrile, methyl methacrylate, ethyl methacrylate, vinyl methacrylate, propyl methacrylate, isopropyl methacrylate, butyl methacrylate, isobutyl methacrylate, tert-butyl methacrylate, hexyl methacrylate, cylohexyl methacrylate, octyl methacrylate, 2-ethylhexyl methacrylate, dodecyl methacrylate, isododecyl methacrylate, octadecyl methacrylate, benzyl methacrylate and 2-hydroxyethyl methacrylate, hydroxypropyl methacrylate (isomer mixture), (2-dimethylamino)ethyl methacrylate, 2,3-epoxypropyl methacrylate, 2-(acetoacetoxy)ethyl methacrylate, 3-sulfopropyl methacrylate potassium salt, dimethyl[2-(methacryloyloxy)ethyl]-(3-sulfopropyl) ammoniumbetaine, dimethyl[3-(methacryloyl amino)propyl]-(3-sulfopropyl) ammoniumbetaine, 2-acrylamido-2-methylpropane-1-sulfonic acid (AMPS®) and its salts, styrene, methylstyrene, ethylstyrene, divinylbenzene and styrenesulfonic acid sodium salt can be used as suitable monomers. In addition, (meth)acrylates which have a double bond capable of free radical polymerization and are based on methoxypolyethylene glycol, (meth)acrylates which have two or more double bonds capable of free radical polymerization and are based on low molecular weight and/or high molecular weight polymeric polyols or vinyltriisopropoxysilane (CoatOSil 1706, from Witco) and gamma-methacryloyloxypropyltriisopropoxysilane (CoatOSil 1757, from Witco) or mixtures thereof can also be used. Also suitable in principle are vinyl halides, such as vinyl chloride, vinyl esters, such as vinyl acetate, 1,3-butadiene, isoprene and maleic anhydride and its derivatives. Acrylic acid and its derivatives and/or methacrylic acid and its derivatives and/or styrene and its derivatives are preferably used, but preferably combinations of 5 to 95% by weight of methyl methacrylate and 5 to 95% by weight of n-butyl acrylate.

The initiator component (G) consists of at least one lipophilic free radical initiator having one or more thermally labile azo or peroxo groups which have a half-life of one hour at a decomposition temperature in the range from 40 to 120° C.

For example, inorganic peroxides, such as ammonium peroxodisulfate, sodium peroxodisulfate, potassium peroxodisulfate, hydrogen peroxide, organic peroxides, such as percarbonates, diacyl peroxides, such as dibenzyl peroxide, alkyl peroxides, such as tert-butyl hydroperoxide, cumyl hydroperoxide, dialkyl peroxides, such as di-tert-butyl peroxide, acyl alkyl peroxides, such as tert-butyl peroxybenzoate, azo initiators, such as 2,2'-azobis(2-methylbutyronitrile), 2,2'-azobis(2-methylpropionitrile) or 2,2'-azobisisobutyronitrile, or mixtures thereof can be used as suitable free radical initiators. Free radical initiators which have a half-life of 1 hour at a decomposition temperature of 70 to 90° C. are preferably used, but particularly preferably 2,2'-azobisisobutyronitrile.

In the subsequent reaction stage $b_2$), a free radical polymerization of the component (F) within the micelles of the polyurethane base dispersion is carried out by the thermal decomposition of the component (G). The emulsion polymerization in the reaction stage $b_2$) is preferably carried out without further emulsifiers. According to a preferred embodiment, the prepared polyurethane polymer hybrid dispersion is cooled after the end of the polymerization and filtered through a 100 m sieve, any solidified foam present being completely separated off thereby. The shelf-life of the polyurethane polymer hybrid dispersions is therefore guaranteed over relatively long periods. The films of the polyurethane polymer hybrid dispersions have a hydrophilicity which is further reduced in comparison with the films of the parent polyurethane dispersions.

The advantage of this production method is that monomers and initiators can be added together at room temperature and that no additional (external) emulsifiers at all are required for their stabilization in the polyurethane dispersion. The monomers and the initiator are emulsified by the micelles of the polyurethane dispersion. In the free radical polymerization, an interpenetrating network of polyurethane resins and polymer resins, which are connected to one another by formation of a physical network, is formed within the micelles. On hybridization, the charge density or the number of carboxylate groups in the polyurethane polymer hybrid [meq·(100 g)$^{-1}$] is usually considerably reduced. The charge density of the micelles of the polyurethane dispersion or of the anionically modified polyurethane polymers is in each case sufficiently high in order to be able sufficiently to stabilize in addition both the monomers and the polymers produced from the monomers.

The reaction stage $b_2$) is preferably carried out at a temperature difference of 10° C., based on the temperature at which the component (G) has a half-life of 1 hour. With the use of 2,2'-azobisisobutyronitrile as component (H), the reaction stage $b_2$) is preferably carried out at a temperature of 80±10° C.

The pure polymer of the components (G) and (H) in reaction stage $b_2$) has a preferred glass transition temperature of −50 to +100° C., in particular −25 to +25° C. The calculation is carried out with the aid of the Fox equation (Elias, An Introduction to Polymer Science, VCH, Weinheim 1997, page 320).

The solids content of polyurethane polymer hybrid consisting of the components (A) to (G) is preferably adjusted to 30 to 70% by weight, particularly preferably to 40 to 60% by weight, based on the total amount of the polyurethane polymer hybrid dispersion.

The ratio of the proportionate solids contents of polyurethane resin from the components (A) to (E) and polymer resin from the components (F) and (G) is preferably adjusted to 20:80 to 80:20% by weight, particularly preferably to 40:60 to 60:40% by weight.

The content of carboxylate and/or sulfonate groups in the polyurethane polymer hybrid of the components (A) to (G) is preferably adjusted to 5 to 25 meq·(100 g)$^{-1}$, particularly preferably to 10 to 20 meq·(100 g)$^{-1}$, and the acid number is preferably adjusted to 2.5 to 15 meq KOH·g$^{-1}$, particularly preferably to 5 to 12.5 meq KOH·g$^{-1}$.

The mean particle sizes of the polyurethane (polymer hybrid) dispersions are preferably 50 to 500 nm, particularly preferably 100 to 400 nm.

The average molecular weights (number average) of the polyurethane (polymer hybrid) dispersions are preferably 50 000 to 500 000 dalton.

The residual monomer content is preferably less than 0.1% by weight, based on the total amount of the polyurethane polymer hybrid dispersion.

The pure polyurethane (polymer hybrid) dispersions of the components (A) to (E) or (A) to (G) have a water absorption of 0.25 to 25% by weight of distilled water on application of an amount of 0.8 kg m$^{-2}$ after drying for 7 d at 23° C. and 50% relative humidity and storage in water for 7 d at 23° C.

In order to reduce the viscosity of the polyurethane prepolymers or to improve the coalescence of the polyurethane (polymer hybrid) dispersion, organic solvents, such as N-methylpyrrolidone, glycol ethers, such as dipropylene glycol dimethyl ether (Proglyde DMM®), acetone or 2-propanone, methyl ethyl ketone or 2-butanone, and, if required, reactive diluents can be used during and/or after the production according to reaction stages a) and b). After the production, these organic solvents can, if required, be removed again by redistillation. The polyurethane (polymer hybrid) dispersion preferably contains less than 10% by weight of organic solvents. According to a particularly preferred embodiment, the polyurethane (polymer hybrid) dispersion is present in solvent-free form.

In a particularly preferred embodiment, the polyurethane (polymer hybrid) dispersion is produced with the aid of the high solids zero VOC process (cf. WO 99/50 325 and DE 199 49 971). This process is a universal method for the production of tailor-made polyurethane dispersions and polyurethane polymer hybrid dispersions. The low technical requirements of the process and the complete omission of volatile and/or nonvolatile organic solvents permit high space-time yields at low costs. The performance of the polyurethane (polymer hybrid) dispersions according to the invention with respect to freedom from solvent, solids content and material properties are remarkable. Moreover, the simplicity and reproducibility of the method and the shelf-life of the products are noteworthy.

Owing to the ideally linearly segmented structure of the polyurethane polymers, highly pronounced and regular intermolecular domain structure comprising hard segments and soft segments results. Hard segments consist of structural elements comprising rigid urethane and urea groups and short-chain diols which exert a strong interchenary interaction. Soft segments consist of flexible structural elements having carbonate, ester and ether groups which exert a weak interchenary interaction. Owing to their method of production, the polyurethane dispersions have an ideally linearly segmented structure. Here, the expression "ideally linearly segmented structure" denotes that the polyurethane polymers have a linear structure and contain all structural components in a regular arrangement and sequence, resulting in the particular material properties of the polyurethane dispersions. The excellent material properties of the polyurethane dispersions are transferred to the polyurethane polymer hybrid dispersions when the process is carried out in a suitable manner. Depending on the choice of the polyurethane dispersions and of the monomer component, elongation and elongation at the ultimate tensile strength can be varied virtually as desired over wide ranges. The water absorptions of the polyurethane (polymer hybrid) dispersions according to the invention and based on hydrophobically modified block copolymers and/or hydrophobically modified random copolymers are substantially below those of comparable polyurethane (polymer hybrid) dispersions based on polypropylene glycols. On transition from polyurethane dispersions according to the invention to the polyurethane polymer hybrid dispersions according to the invention, a further reduction in the water absorption is observed since the charge is reduced and further hydrophobic polymers are introduced by the monomers.

The present invention furthermore relates to the use of polyurethane (polymer hybrid) dispersions having reduced hydrophilicity in products in construction chemistry.

Although the polyurethane (polymer hybrid) dispersion formulated according to the invention can be used in one- and two-component form, one-component form should be regarded as being preferred owing to the better handling properties. In the case of a two-component application, the polyurethane (polymer hybrid) dispersions formulated according to the invention are used as binder component and water-emulsifiable polyisocyanates as curing component.

The polyurethane (polymer hybrid) dispersions proposed according to the invention and having reduced hydrophilicity are suitable as binders in the preparation of formulations for sports floor coverings and tennis court coverings, for example in the form of:

a) binders for elastic layers, comprising rubber granules or fibers and, if required, additives,
b) adhesive promoters or primers on the substrates of sports floor coverings,
c) spray coatings, if required with structural fillers, for application to resilient or rigid substrates, and
d) leveling coatings for application to resilient or rigid substrates,
e) filling compounds for closing pores of resilient or rigid substrates,
f) adhesives for the adhesive bonding of prefabricated elastic layers,
g) seals, if required in pigmented form, and
h) line-painting paints.

The polyurethane (polymer hybrid) dispersions proposed according to the invention and having reduced hydrophilicity are also suitable as binders in formulations for crack-bridging coating systems in the form of:

a) base, floating or top coats, and spray coatings or seals on preferably primed structure surfaces,
b) if required, flameproofed roof coatings or finishes and
c) if required, flameproofed seals of structures in open cast or underground mining.

The polyurethane (polymer hybrid) dispersions according to the invention and having reduced hydrophilicity can be used in the construction sector also as binders for coatings, sealants, printing inks, paints and finishes, adhesives, membranes for the surfaces of mineral building materials, such as, for example, concrete, gypsum, ceramic, clay or cement, and for the surfaces of glass, rubber, wood and woodbase materials, plastic, metal, paper and composite materials and for the treatment of hydraulic binders.

The polyurethane (polymer hybrid) dispersions according to the invention are also suitable as binders for the coating of natural and synthetic leathers and paper and cardboard boxes and for the production of synthetic leathers.

It is also possible in principle, within the formulations, to combine the polyurethane (polymer hybrid) dispersions according to the invention and having reduced hydrophilicity with aqueous or nonaqueous binders and/or to combine formulations based on polyurethane (polymer hybrid) dispersions according to the invention and having reduced hydrophilicity with formulations based on aqueous or non-aqueous binders. The term aqueous or nonaqueous binders denotes water-based polyurethanes, polymer dispersions, redispersible polymer powders or nonaqueous solvent-containing or solvent-free and optionally reactive polymers.

The individual formulation components are fillers, pigments, plasticizers, fiber materials, antifoams, deaerators, lubricant and leveling additives, dispersing additives, substrate wetting additives, water repellents, rheology auxiliaries, adhesion promoters, flameproofing agents, antifreezes, antioxidants, UV stabilizers and preservatives.

The formulation component can be introduced during and/or after the production of the polyurethane (polymer hybrid) dispersions. In the case of a polyurethane (polymer hybrid) dispersion formulated in situ, the formulation is integrated into the production process of the binder, i.e. the (inert) formulation components are initially introduced completely or partly in the dispersing medium.

The application of the polyurethane (polymer hybrid) dispersions according to the invention and having reduced hydrophilicity is effected by the methods known from coating technology, such as, for example, flooding, casting, knife coating, spraying, brushing, immersion or rolling.

The following examples are intended to illustrate the invention in more detail.

EXAMPLES

Example A

Polyalkylene Oxides Made Water-Repellent

Example A.1

Poly(propylene Oxide)-block-poly(butylene Oxide)-block-poly(propylene Oxide) Comprising 42% by Weight of a Polybutylene Oxide Middle Block 0.2 g (1 mol) of 1,4-butanediol and 16.8 g of a 50% strength aqueous KOH were introduced into a reactor. After careful flushing with ultrapure nitrogen, the water present was distilled off at 120° C. After cooling to 115° C., 1 000 g (13.9 mol) of 1,2-butylene oxide were added in the course of 1½ hours. After a further 2½ hours, the addition reaction of the butylene oxide was complete. 1 410 g (24.3 mol) of propylene oxide were then metered into the reactor so rapidly that the internal temperature did not exceed 120° C. and the pressure did not exceed 2.5 bar. After complete introduction of the propylene oxide, the temperature was kept at 115° C. until a constant manometer pressure indicated the end of the subsequent reaction. Finally, the unconverted residual monomers were removed in vacuo at 80 to 90° C. The product obtained was neutralized with the aid of phosphoric acid, the water was removed by distillation and the resulting potassium phosphate was removed by filtration together with a filtration aid.

The molecular weight from the determination of the hydroxyl number at an assumed functionality of 2 was M=2 113 g/mol.

| Characteristic | Colorless liquid |
|---|---|
| Viscosity (DIN 53015) | about 200 mPas (25° C.) |
| Hydroxyl number | 53.1 mg KOH $g^{-1}$ |
| Molecular weight (calc.) | 2 113 dalton |

Example A.2

Poly(propylene Oxide)-block-poly(tetramethylene Oxide)-block-poly(propylene Oxide) Comprising 33% by Weight of a Polytetrahydrofuran Middle Block The polyalkylene oxide A.2 according to the invention, which had been made water-repellent and was to be used according to the invention, was prepared in a manner analogous to that described for the polyalkylene oxide from example A.1, which had been made water-repellent.

Starting materials used were commercially available polytetrahydrofuran (506.5 g, 0.78 mol), BASF trade name "Polytetrahydrofuran 650 S", 50% strength aqueous KOH (6.8 g) and PO (1 446 g, 24.9 mol).

The molecular weight from the determination of the hydroxyl number at an assumed functionality of 2 was M=1 982 g/mol.

| Characteristic | Colorless liquid |
| --- | --- |
| Viscosity (DIN 53015) | about 600 mPas (25° C.) |
| Hydroxyl number | 56.6 mg KOH $g^{-1}$ |
| Molecular weight (calc.) | 1 982 dalton |

Example A.3

Poly(propylene Oxide)-block-poly(styrene Oxide)-block-poly(propylene Oxide) Comprising 21% by Weight of a Polystyrene Oxide Middle Block The polyalkylene oxide A.3 which had been made water-repellent and was to be used according to the invention was prepared in a manner analogous to that described for the polyalkylene oxide from example A.1, which had been made water-repellent.

Starting materials used were 1,4-butanediol (90.1 g, 1 mol), 50% strength aqueous KOH (16.8 g), styrene oxide (500 g, 4.2 mol) and PO (1 910 g, 32.9 mol).

The molecular weight from the determination of the hydroxyl number at an assumed functionality of 2 was M=1 748 g/mol.

| Characteristic | Colorless liquid |
| --- | --- |
| Viscosity (DIN 53015) | about 900 mPas (25° C.) |
| Hydroxyl number | 64.2 mg KOR $g^{-1}$ |
| Molecular weight (calc.) | 1 748 dalton |

Example A.4

Poly(butylene Oxide)-co-poly(propylene Oxide) Comprising 42% by Weight of Butylene Oxide 90.2 g (1 mol) of 1,4-butanediol and 16.8 g of 50% strength aqueous KOH were introduced into a reactor. After careful flushing with ultrapure nitrogen, the water present was distilled off at 120° C. After cooling to 115° C., a mixture of 1 000 g (13.9 mol) of 1,2-butylene oxide and 1 410 g (24.3 mol) of propylene oxide was metered into the reactor so rapidly that the internal temperature did not exceed 120° C. and the pressure did not exceed 2.5 bar. After complete introduction of the monomer mixture, the temperature was kept at 115° C. until a constant manometer pressure indicated the end of the subsequent reaction. Finally, the unconverted residual monomers were removed in vacuo at 80 to 90° C. The product obtained was neutralized with the aid of phosphoric acid, the water was removed by distillation and the resulting potassium phosphate was removed by filtration together with a filtration aid.

The molecular weight from the determination of the hydroxyl number at an assumed functionality of 2 was M=2 082 g/mol.

Example A.5

Poly(butylene Oxide)-block-poly(propylene Oxide)-block-poly(butylene Oxide) Comprising 42% by Weight of Butylene Oxide The preparation was carried out analogously to example A.1.

Example A.6

Poly(propylene Oxide)-block-poly(butylene Oxide)-block-poly(propylene Oxide) Comprising 60% by Weight of a Polybutylene Oxide Middle Block The preparation was carried out analogously to example A.1.

Example A.7

Poly(propylene Oxide)-block-poly(butylene Oxide)-block-poly(dodecene Oxide)-block-poly(butylene Oxide)-block-poly(propylene Oxide)

The preparation was carried out analogously to example A.1.

Example B

Polyurethane Dispersions Having Reduced Hydrophilicity

Example B.1

Solvent-Free Polyurethane-Based Dispersion Based on the Polyalkylene Oxide from Example A.1 which had been Made Water-Repellent A mixture of 100.00 g of the polypropylene glycol from example A.1, made water-repellent and having a hydroxyl number of 53.1 mg KOHg$^{-1}$ (from Tego Chemie Service GmbH), and 35.62 g of isophorone diisocyanate (Vestanat IPDI, from Creanova Spezialchemie GmbH) was stirred for 2 h at 80–90° C. in the presence of 0.1 g of dibutyltin dilaurate (DBTL) as a catalyst while blanketing with nitrogen in a four-necked flask equipped with a KPG stirrer, a reflux condenser, a thermometer and a nitrogen blanketing means. After addition of 4.40 g of finely milled dimethylolpropionic acid (DMPA) to the preadduct, the mixture was further stirred at 80-90° C., while blanketing with nitrogen, until the calculated NCO content was reached (theory: 4.81% by weight). The course of the reaction was monitored acidimetrically.

After cooling to 60° C., the prepolymer was directly neutralized with 2.99 g of triethylamine (TEA). The prepolymer was then dispersed in 146.86 g of water with thorough stirring and was then subjected to chain extension with 3.85 g of ethylenediamine (EDA) for producing the polyurethane dispersion.

A stable polyurethane dispersion having the following characteristics was obtained:

| Characteristic | Milky white liquid |
| --- | --- |
| Solids content | 50% by weight |
| Charge density | 20.12 meq · (100 g)$^{-1}$ |

Examples B.2 to B.4

Solvent-Free Polyurethane-Based Dispersions Based on Polyalkylene Oxides from Examples A.1 and A.2 which had been Made Water-Repellent The preparation was carried out analogously to example B.1, but the following were used:

| Example | B.2 | B.3 | B.4 | V.1* |
|---|---|---|---|---|
| PPG | A.1 | A.2 | A.2 | conventional PPG |
| DMPA ® | 4.10 g | 4.00 g | 3.80 g | 4.00 g |
| IPDI | 34.63 g | 35.69 g | 35.03 g | 35.49 g |
| TEA | 2.78 g | 2.72 g | 2.58 g | 2.72 |
| EDA | 3.75 g | 3.86 g | 3.79 g | 3.83 |
| H$_2$O | 145.26 g | 146.26 g | 145.19 g | 146.04 |
| NCO (theory) | 4.72% by weight | 4.83% by weight | 4.77% by weight | 4.81% by weight |
| Characteristic | | | milky white liquid | |
| Solids content [% by weight] | | | 50 | |
| Charge density [meq · (100 g)$^{-1}$] | 18.91 | 18.38 | 17.56 | 18.41 |

*Comparative example V.1 based on a conventional polypropylene glycol having a hydroxyl number of 56 mg KOH g$^{-1}$ Property Profile of the Solvent-Free Polyurethane Dispersions from Examples B.1 to B.4 Example

| Example | B.1 | B.2 | B.3 | B.4 | V.1 |
|---|---|---|---|---|---|
| Tensile strength σM | 25.1 MPa | 19.9 MPa | 27.5 MPa | 26.6 MPa | 24.8 MPa |
| Elongation at the tensile strength εM | 799% | 799% | 769% | 785% | 862% |
| Water absorption (drying for 2 d) after 4 h [% by weight] | 7.9 | 7.4 | 9.4 | 9.2 | 10.8 |
| Water absorption (drying for 2 d) after 7 d [% by weight] | 25.8 | 26.2 | 30.4 | 27.5 | disintegrated |
| Water absorption (drying for 7 d) after 4 h [% by weight] | 5.4 | 5.6 | 7.0 | 6.8 | 7.7 |
| Water absorption (drying for 7 d) after 7 d [% by weight] | 17.3 | 17.3 | 22.6 | 232.5 | 28.6 |

Material Properties According to EN ISO 527

Water Absorption (Internal Standard):

In order to determine the water absorption, 5.00 g of the polyurethane dispersion were weighed into a standardized mold (Ø9 cm, about 0.8 kgm$^{-2}$) and dried for 2 d and 7 d under standard climate conditions (23° C., 50% relative humidity) (three specimens in each case), the castings being turned several times. The castings were then suspended in distilled water at 23° C. and weighed after 4 h and 7 d. In order to determine the absolute content of nonvolatile fractions as a reference value, 5.00 g of the polyurethane dispersion were weighed into a standardized mold and dried for 1 d under standard climate conditions and for 7 d at 50° C. (three specimens in each case).

Example B.5

Solvent-Free Polyurethane-Based Dispersion Based on the Polyalkylene Oxide from Example A.3 which had been Made Water-Repellent The preparation was carried out analogously to examples B.1 to B.4.

Example B.6

Solvent-Free Polyurethane-Based Dispersion Based on the Polyalkylene Oxide from Example A.4 which had been Made Water-Repellent The preparation was carried out analogously to examples B.1 to B.4.

Example B.7

Solvent-Free Polyurethane-Based Dispersion Based on the Polyalkylene Oxide from Example A.5 which had been Made Water-Repellent The preparation was carried out analogously to examples B.1 to B.4.

Example B.8

Solvent-Free Polyurethane-Based Dispersion Based on the Polyalkylene Oxide from Example A.6 which had been Made Water-Repellent The preparation was carried out analogously to examples B.1 to B.4.

Example B.9

Solvent-Free Polyurethane-Based Dispersion Based on the Polyalkylene Oxide from Example A.7 which had been Made Water-Repellent The preparation was carried out analogously to examples B.1 to B.4.

The solvent-free polyurethane dispersions from examples B.1 to B.9 have lower water absorptions than comparative example V.1.

Examples C

Polyurethane Polymer Hybrid Dispersions Having Reduced Hydrophilicity

Example C.1

Solvent-Free Polyurethane Polymer Hybrid Dispersion Based on the PPG from Example A 290.52 g of the solvent-free polyurethane-based dispersion from example B.2 were initially introduced into a double-jacket vessel equipped with a thermostat, a stirrer, a reflux condenser and an internal thermometer and were diluted with 150.64 g of water. A mixture of 67.25 g of n-butyl acrylate, 28.82 g of methyl methacrylate and 0.77 g of 2,2'-azobisisobutyronitrile was prepared in a separate vessel and was added to the dilute polyurethane-based dispersion with the aid of a metering pump in the course of 1 h. The reaction mixture was then slowly heated to 50 to 60° C., and stirring was carried out for a further 5 h at 80 to 90° C. after the initiation of the polymerization reaction.

A stable polyurethane polymer hybrid dispersion having the following characteristics was obtained:

| Characteristic | Milky white liquid |
|---|---|
| Solids content | about 45% by weight |
| Charge density | 11.35 meq · (100 g)$^{-1}$ |

Comparative Example V.2

Solvent-Free Polyurethane Polymer Hybrid Dispersion Based on a Conventional PPG

The preparation was carried out analogously to example C.1.

292.08 g of the solvent-free polyurethane-based dispersion from example V.1, 151.45 g of water, 67.61 g of n-butyl acrylate, 28.98 g of methyl methacrylate and 0.77 g of 2,2'-azobisisobutyronitrile were used. A stable polyurethane polymer hybrid dispersion having the following characteristics was obtained:

| Characteristic | Milky white liquid |
|---|---|
| Solids content | about 45% by weight |
| Charge density | 11.04 meq · (100 g)$^{-1}$ |

Property Profile of the Solvent-Free Polyurethane Polymer Hybrid Dispersion from Example C.1

| Example | C.1 | V.2 |
|---|---|---|
| Tensile strength$_M$ | 9.5 MPa | 10.0 MPa |
| Elongation at the tensile strength$_M$ | 795% | 804% |
| Water absorption (drying for 2 d) after 4 h [% by weight] | 4.8 | 7.8 |
| Water absorption (drying for 2 d) after 7 d [% by weight] | 22.9 | 27.3 |
| Water absorption (drying for 7 d) after 4 h [% by weight] | 4.8 | 7.0 |
| Water absorption (drying for 7 d) after 7 d [% by weight] | 16.33 | 21.0 |

Material Properties According to EN ISO 527
Water Absorption (Internal Standard):

In order to determine the water absorption, 5.00 g of the polyurethane polymer hybrid dispersion were weighed into a standardized mold (Ø9 cm, about 0.8 kgm$^{-2}$) and dried for 2 d and 7 d under standard climate conditions (23° C., 50% relative humidity) (three specimens in each case), the castings being turned several times. The castings were then suspended in distilled water at 23° C. and weighed after 4 h and 7 d. In order to determine the absolute content of nonvolatile fractions as a reference value, 5.00 g of the polyurethane polymer hybrid dispersion were weighed into a standardized mold and dried for 1 d under standard climate conditions and for 7 d at 50° C. (three specimens in each case).

The solvent-free polyurethane polymer hybrid dispersion from example C.1 has a lower water absorption than comparative example V.2.

What is claimed is:

1. A polyurethane or polyurethane polymer hybrid dispersion having low hydrophilicity, prepared by the process comprising the steps of reacting
   a) 50 to 100 parts by weight of a hydrophobically modified block copolymer (A)(i) having two or more hydroxyl groups and a molecular weight of 500 to 6,000 dalton, comprising 10 to 90% by weight of a polymer having properties imparting water repellency and 90 to 10% by weight of a polypropylene oxide polymer, and/or 50 to 100 parts by weight of a hydrophobic block copolymer (A) (ii) having two or more hydroxyl groups and a molecular weight of 500 to 6,000 dalton, comprising two or more hydrophobic alkylene oxides, and/or 50 to 100 parts by weight of a hydrophobically modified random copolymer (A) (iii) having two or more hydroxyl groups and a molecular weight of 500 to 6,000 dalton, comprising 10 to 90% by weight of a hydrophobic alkylene oxide in combination with suitable initiator molecules and 90 to 10% by weight of propylene oxide;
   b) 14 to 140 parts by weight of a polyol component (B), containing b$_1$) 2 to 20 parts by weight of a low molecular weight and anionogenic polyol component (B)(i) having two or more hydroxyl groups and one or wore carboxyl and/or sulfo group(s) inert to polyisocyanates and a molecular weight of 100 to 1,000 dalton,
   b$_2$) if required, 2 to 20 parts by weigh of a low molecular weight polyol component (B)(ii) having two or more hydroxyl groups and a molecular weight of 50 to 499 dalton,
   b$_3$) if required, 10 to 100 parts by weight of a further polymeric polyol (B) (iii) having two or more hydroxyl groups and a molecular weight of 500 to 6,000 dalton;
   c) 25 to 250 parts by weight of a polyisocyanate component (C) comprising at least one polyisocyanate, polyisocyanate derivative or polyisocyanate homolog having two or more aliphatic or aromatic isocyanate groups;
   d) 2 to 20 parts by weight of a neutralizing component (D);
   e) 3 to 30 parts by weight of a chain-extender component (E); and
   f) 100 to 5,000 parts by weight of water to give a solvent-free or low-solvent polyurethane dispersion and, if required, then allowing said dispersion to react further with
   g) 117.5 to 3,200 parts by weight of a monomer component (F) comprising at least one monomer having one or more double bonds capable of free radical polymerization and
   h) 0.5 to 50 parts by weight of an initiator component (G) comprising at least one lipophilic free radical initiator having one or more thermally labile azo or peroxo groups to give a solvent-free or low-solvent polyurethane polymer hybrid dispersion.

2. The polyurethane (polymer hybrid) dispersion as claimed in claim 1, wherein the component (A) (i) is a saponification-stable block copolymer having an ABA, BAB or (AB)$_n$ structure, A representing a polymer segment having properties imparting water repellency and B representing a polymer segment based on polypropylene oxide.

3. The polyurethane (polymer hybrid) dispersion as claimed in claim 2, wherein the component (A)(ii) is a saponification-stable block copolymer having an A$_1$, A$_2$, A$_3$ or (A$_1$A$_2$)$_n$ structure, A$_1$, A$_2$ and A$_3$ each representing polymer segments having properties imparting water repellency.

4. The polyurethane (polymer hybrid) dispersion as claimed in claim 3, wherein the polymer segments A, A$_1$, A$_2$ and A$_3$ consist of polybutylene oxide, polydodecyl oxide, polyisoamyl oxide, polyoxetane, substituted polyoxetane, poly-α-pinene oxide, polystyrene oxide, polytetramethylene oxide, further aliphatic or aromatic polyoxyalkylenes having 4 to 30 carbon atoms per alkylene oxide, α,ω-polymethacrylatediols, α,ω-dihydroxyalkylpolydimethylsiloxanes, macromonomers, telechelic polymers or mixtures thereof.

5. The polyurethane (polymer hybrid) dispersion as claimed in claim 1, wherein the hydrophobically modified block copolymer (A)(i) is selected from the group consisting of poly(propylene oxide)-block-poly(butylene oxide)-block-poly(propylene oxide), poly(propylene oxide)-block-poly(styrene oxide)-block-poly(propylene oxide), poly(propylene oxide)-block-poly(tetramethylene oxide)-block-poly(propylene oxide), poly(butylene oxide)-block-poly(propylene oxide)-block-poly(butylene oxide), and poly(styrene oxide)-block-poly(propylene oxide)-block-poly (styrene oxide) and the hydrophobic block copolymer (A) (ii) is poly (butylene oxide)-block-poly(tetramethylene oxide)-block-poly(butylene oxide), composed of 10 to 90% by weight of at least one of polybutylene oxide, polystyrene oxide and polytetramethylene oxide and 90 to 10% by weight of propylene oxide, having a molecular weight of 1,000 to 3,000 dalton.

6. The polyurethane (polymer hybrid) dispersion as claimed in claim 1, wherein the component (A) (iii) is a saponification-stable random copolymer of at least one hydrophobic alkylene oxide and propylene oxide.

7. The polyurethane (polymer hybrid) dispersion as claimed in claim 6, wherein the hydrophobic alkylene oxide is at least one hydrophobic alkylene oxide selected from the group consisting of butylene oxide, dodecyl oxide, isoamyl oxide, oxetane, substituted oxetane, α-pinene oxide, styrene oxide, an aliphatic polyoxyalkylene having 4 to 30 carbon atoms per alkylene oxide and an aromatic polyoxyalkylene having 4 to 30 carbon atoms per alkylene oxide.

8. The polyurethane (polymer hybrid) dispersion as claimed in claim 1, wherein the hydrophobically modified random copolymer (A) (iii) is selected from the group consisting of poly(butylene oxide)-co-poly(propylene oxide) and/or poly(dodecyl oxide)-co-poly(propylene oxide) and/or poly(isoamyl oxide)-co-poly(propylene oxide), poly(α-pinene oxide)-co-poly(propylene oxide), and poly(styrene oxide)-co-poly(propylene oxide), comprising of 10 to 90% by weight of an oxide selected from the group consisting of butylene oxide and/or dodecyl oxide and/or isoamyl oxide and/or α-pinene oxide and/or styrene oxide and 90 to 10% by weight of propylene oxide, having a molecular weight of 1,000 to 3,000 dalton.

9. The polyurethane (polymer hybrid) dispersion as claimed in claim 1, wherein the components (A) (i), (A) (ii) and (A) (iii) have polymer segments based on polyalkylene oxides which contain bisphenol A and/or other hydrophobic initiator molecules.

10. The polyurethane (polymer hybrid) dispersion as claimed in claim 1, wherein the component (B) (i) is a bishydroxyalkanecarboxylic acid.

11. The polyurethane (polymer hybrid) dispersion as claimed in claim 10, wherein the bishydroxyalkanecarboxylic acid is dimethylol-propionic acid.

12. The polyurethane (polymer hybrid) dispersion as claimed in claim 1, wherein the component (B) (iii) is a polymeric polyol, such as a polyalkylene glycol, aliphatic or aromatic polyester, polycaprolactone, polycarbonate, α,ω-polymethacrylatediol, α,ω-dihydroxyalkylpolydimethylsiloxane, macromonomers, telechelic polymer, hydroxyfunctional epoxy resin or a mixture thereof.

13. The polyurethane (polymer hybrid) dispersion as claimed in claim 1, wherein the ratio of the number of equivalents of NCO to that of OH of the components (A), (B) and (C) is adjusted to a value of 1.25 to 2.5.

14. The polyurethane (polymer hybrid) dispersion as claimed in claim 1, wherein the neutralizing component (D) is present in amounts such that the degree of neutralization, based on the free carboxyl and/or sulfo groups of the polyurethane prepolymer, is 70 to 100 equivalent %.

15. The polyurethane (polymer hybrid) dispersion as claimed in claim 1, wherein the chain-extender component (E) is present in an amount such that the degree of chain extension, based on the free isocyanate groups, is 50 to 100 equivalent %.

16. The polyurethane (polymer hybrid) dispersion as claimed in claim 1, wherein the component (F) is acrylic acid and its derivatives and/or methacrylic acid and its derivatives and/or styrene and its derivatives.

17. The polyurethane (polymer hybrid) dispersion as claimed in claim 1, wherein the component (G) is a free radical initiator which has a half-life of 1 hour at a decomposition temperature in the range of 40 to 120° C.

18. The polyurethane (polymer hybrid) dispersion as claimed in claim 17, wherein the component (G) is 2,2'-azobisisobutyronitrile.

19. The polyurethane (polymer hybrid) dispersion as claimed in claim 1, wherein the molar initiator/monomer ratio of the components (F) and (G) is adjusted in a range of 0.001 to 0.05.

20. The polyurethane (polymer hybrid) dispersion as claimed claim 1, wherein in the polyurethane polymer of the components (A) to (E), the content of carboxylate and/or sulfonate groups is adjusted to 10 to 50 meq·(100 g)$^{-1}$, and the acid number is adjusted to 5 to 30 meq KOH·g$^{-1}$.

21. The polyurethane (polymer hybrid) dispersion as claimed in claim 1, wherein the polyurethane hybrid polymer of the components (A) to (G), the content of carboxylate and/or sulfonate groups is adjusted to 5 to 25 meq·(100 g)$^{-1}$, and the acid number is adjusted to 2.5 to 15 meq KOH·g$^{-1}$.

22. The polyurethane (polymer hybrid) dispersion as claimed in claim 1, wherein the solids content polyurethane polymer consisting of the components (A) to (E) is adjusted to 30 to 70% by weight, based on the total amount of the polyurethane dispersion.

23. The polyurethane (polymer hybrid) dispersion as claimed in claim 1, wherein the solids content of polyurethane hybrid polymer consisting of the components (A) to (G) is adjusted to 30 to 70% by weight, based on the total amount of the polyurethane polymer hybrid dispersion.

24. The polyurethane (polymer hybrid) dispersion as claimed in claim 1, wherein the ratio of the proportion of solids contents of polyurethane resin comprising the components (A) to (E) and polymer resin comprising the components (F) and (G) is adjusted to 20:80 to 80:20% by weight.

25. The polyurethane (polymer hybrid) dispersion as claimed in claim 1, wherein the polyurethane dispersions or polyurethane polymer hybrid dispersions contain less than 10% by weight of organic solvents.

26. The polyurethane (polymer hybrid) dispersion as claimed in claim 1, wherein the mean particle size of micelles in the dispersion ranges from 50 to 500 nm.

27. The polyurethane (polymer hybrid) dispersion as claimed in claim 1, wherein the average molecular weight (number average) is 50,000 to 500,000 dalton.

28. The polyurethane (polymer hybrid) dispersion as claimed in claim 1, wherein the pure binder comprising the components (A) to (E) or (A) to (G) exhibit a water absorption of 0.25 to 25% by weight of distilled water an application of an amount of 0.8 kg m$^{-2}$ after drying for 7 d at 23° C. and 50% relative humidity and storage in water at 23° C. for 7 d.

29. A method for producing a polyurethane or polyurethane polymer hybrid dispersion with reduced hydrophilicity as claimed 1, wherein the solvent-free or low-solvent polyurethane dispersion is prepared by a$_1$) reacting the components (A), (B) (ii), (B) (iii) and (C), optionally in the presence of a catalyst, to give a polyurethane preadduct and/or preparing a premix of the components (A) and (B), a$_2$) reacting the preadduct from stage a$_1$) with the component (B) (i) and/or the premix from stage a$_1$) with the component (C), if required stepwise, to give a polyurethane prepolymer, a₃) then neutralizing the polyurethane prepolymer from stage a2) before and/or during the dispersing in water with the component (D).

a₄) then subjecting the neutralized and dispersed polyurethane prepolymer from stage a₃) to chain extension with the component (E)

and, if required, then preparing a solvent-free or low-solvent polyurethane polymer hybrid dispersion by b₁) diluting the polyurethane dispersion from stage a₄), if required, with water and then adding a prepared mixture of the components (F) and (G), and finally b₂) carrying out a free radical polymerization of the component (F) by the thermal decomposition of the component (G).

30. The method as claimed in claim 29, wherein the reaction stages a₁) and a₂) are carried out at a temperature of 60 to 120° C.

31. The method as claimed in claim 29, wherein the reaction stage a3) is carried out at a temperature of 40 to 60° C.

32. The method as claimed in claim 29, wherein the reaction stage B₄)is carried out at 30 to 50° C.

33. The method as claimed in claim 29, wherein the reaction stage b₁) is carried out at a temperature of 1.5 to 35° C.

34. The method as claimed in claim 29, wherein the reaction stage b₂) is carried out at a temperature difference of ±10° C. based on the temperature at which the component (G) has a half-life of 1 hour.

35. The method claimed in claim 29, wherein the reaction stage b₂) is carried out at a temperature of 80±10° C. with the use of 2,2'-azobisisobutyronitrile as component (G).

36. The method as claimed in claim 29, wherein any free NCO groups still present are subjected to complete chain extension with water after the reaction stage a₄).

37. The method as claimed in claim 29, wherein the free radical polymerization in the reaction stage b₂) is carried out without further emulsifiers.

38. The polyurethane (polymer hybrid) dispersion as claimed in claim 1, wherein the ratio of the number of equivalents of NCO to that of OH of the components (A), (B) and (C) is adjusted to a value of 1.4 to 2.0.

39. The polyurethane (polymer hybrid) dispersion as claimed in claim 26, wherein the mean particle size of micelles in the dispersion ranges from 100 to 400 nm.

40. The polyurethane (polymer hybrid) dispersion as claimed in claim 14, wherein the neutralizing component (D) is present in amounts such that the degree of neutralization, based on the free carboxyl and/or sulfa groups of the polyurethane prepolymer, is 90 to 100 equivalent %.

41. The polyurethane (polymer hybrid) dispersion as claimed in claim 15, wherein the chain-extender component (F) is present in an amount such that the degree of chain extension, based on the free isocyanate groups is 70 to 80 equivalent %.

42. The polyurethane (polymer hybrid) dispersion as claimed claim 1, wherein in the polyurethane polymer of the components (A) to (E), the content of carboxylate and/or sulfonate groups is adjusted to 15 to 45 meq·(100 g)$^{-1}$, and the acid number is adjusted to 10 to 25 meg KOH·g$^{-1}$.

43. The polyurethane (polymer hybrid) dispersion as claimed in claim 1, wherein the polyurethane hybrid polymer of the components (A) to (G), the content of carboxylate and/or sulfonate groups is adjusted to 10 to 20 meq·(100 g)$^{-1}$, and the acid number is adjusted to 5 to 12.5 meq KOH·g$^{-1}$.

44. The polyurethane (polymer hybrid) dispersion as claimed in claim 1, wherein the solids content of polyurethane polymer consisting of the components (A) to (E) is adjusted to 40 to 60% by weight based on the total amount of the polyurethane dispersion.

45. The polyurethane (polymer hybrid) dispersion as claimed in claim 1, wherein the solids content of polyurethane hybrid polymer consisting of the components (A) to (G) is adjusted to 40 to 60% by weight, based on the total amount of the polyurethane polymer hybrid dispersion.

46. The polyurethane (polymer hybrid) dispersion as claimed in claim 1, wherein the ratio of the proportion of solids contents of polyurethane resin comprising the components (A) to (E) and polymer resin comprising the components (F) and (G) is adjusted to 40:60 to 60:40% by weight.

47. The method as claimed in claim 29, wherein the reaction stages a₁) and B₂) are carried out at a temperature of 80 to 100° C.

48. The method as claimed in claim 29, wherein the reaction stage b₁) is carded out at a temperature of 20 to 30° C.

* * * * *